Jan. 24, 1967   J. G. TOPLIS   3,299,745
EPICYCLIC GEAR ASSEMBLIES
Filed May 8, 1964   3 Sheets-Sheet 1
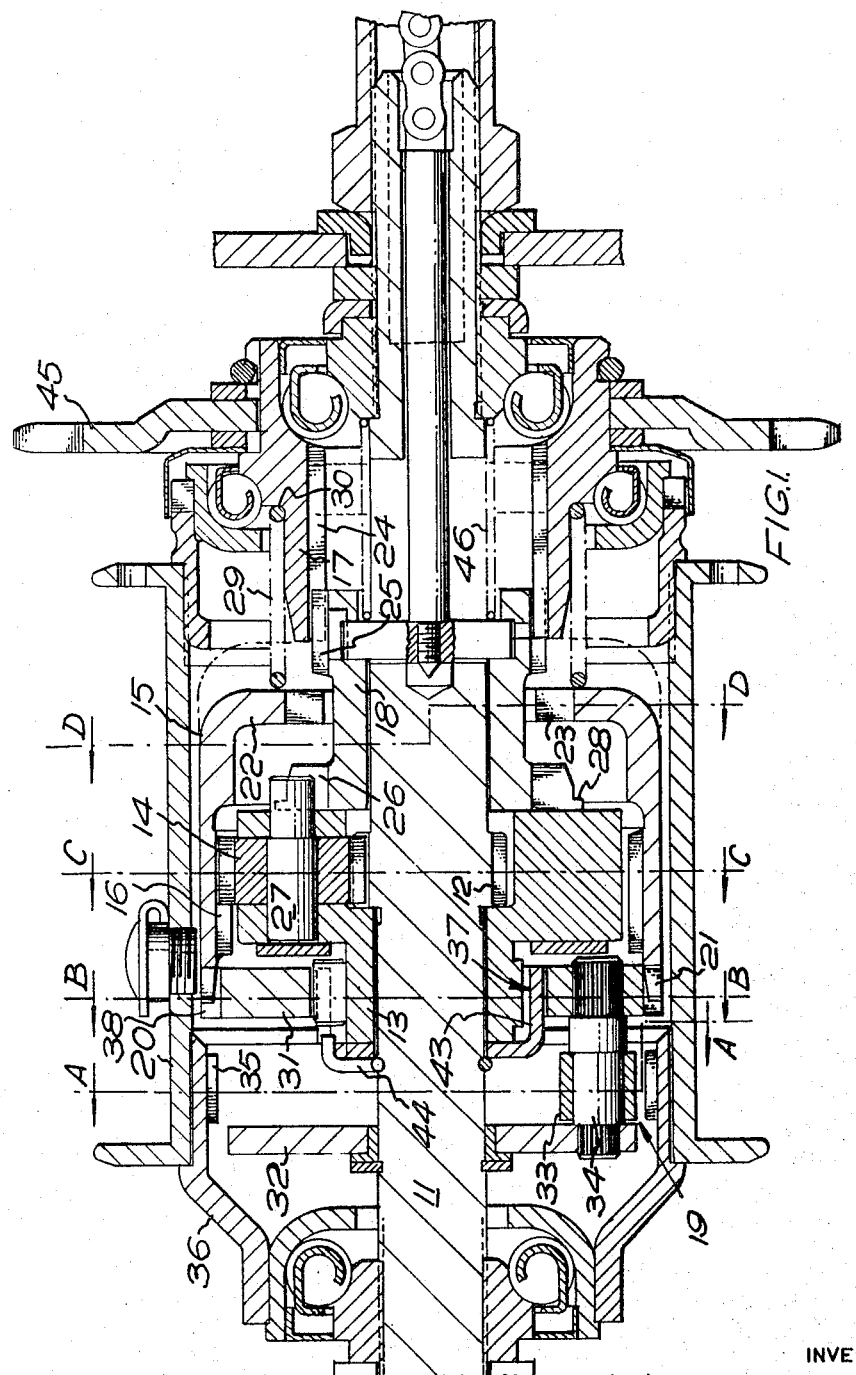
INVENTOR:
John G. Toplis
BY Bierman Bierman Jan. 24, 1967    J. G. TOPLIS    3,299,745
EPICYCLIC GEAR ASSEMBLIES
Filed May 8, 1964    3 Sheets-Sheet 2

INVENTOR:
John G. Toplis
BY
Bierman & Bierman

INVENTOR:
John G. Toplis
BY
Bierman & Bierman

United States Patent Office 3,299,745
Patented Jan. 24, 1967

3,299,745
EPICYCLIC GEAR ASSEMBLIES
John Geoffrey Toplis, Beeston, Nottingham, England, assignor to Raleigh Industries Limited, a company of Great Britain, Northern Ireland, and the Isle of Man
Filed May 8, 1964, Ser. No. 365,895
Claims priority, application Great Britain, May 17, 1963, 19,619/63
17 Claims. (Cl. 74—750)

The invention concerns epicyclic gear assemblies and has particular reference to epicyclic change speed gear hubs for bicycles and the like.

It is among the objects of the present invention to provide a simplified bicycle change speed gear hub of cheaper construction than conventional hubs and which is silent in operation in all gears.

According to the present invention an epicyclic change speed gear hub including a fixed sun gear, a plurality of planet gears rotatable about said fixed gear, a planet cage in which said planet gears are supported, a gear ring disposed radially outwardly of said planet gears and in engagement therewith, a driver adapted, selectively, to be coupled with said gear ring or said planet cage, an axially movable selector sleeve adapted to effect such coupling, and a ratchet assembly adapted to transmit the motion of said planet cage or gear ring to a hub shell is characterised in that said gear ring is axially displaceable into or out of engagement with said ratchet assembly and a unidirectional clutch means is provided between the planet cage and the ratchet assembly, the said means being adapted to transmit a drive from the planet cage to the ratchet assembly when the gear ring is operatively disengaged from such assembly but to be inoperative in transmitting a drive when the gear ring is in operative engagement with the said assembly.

In a preferred embodiment the unidirectional clutch means comprises a clutch or free-wheel of the wedge roller type.

The invention will now be described further, by way of example only, with reference to the (drawings filed with the provisional specification) illustrating one embodiment thereof and in which:

FIG. 1 is a longitudinal section taken through a gear hub constructed according to the invention, the hub being shown in high gear;

Figure 3:
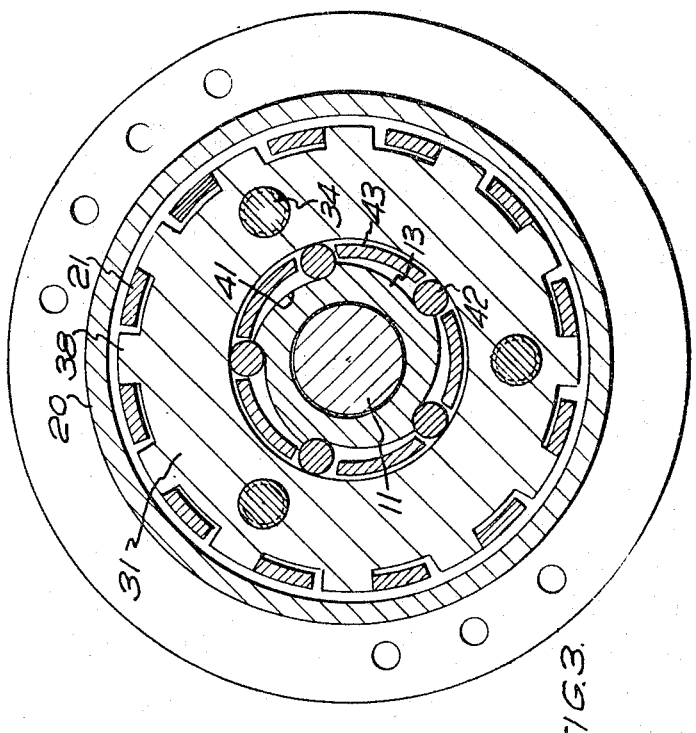
FIG. 3 is a section on line B—B of FIG. 1.

Referring now to the drawings an epicyclic change speed gear hub comprises a hub axle 11, a sun gear 12 formed integrally with said axle, a planet cage 13 supporting planet gears 14 in engagement with said sun gear 12, a gear ring 15 having internal teeth 16 in mesh with the said planet gears 14, a driver 17 adapted selectively to be coupled to said planet cage 13 or said gear ring 15 through a selector sleeve 18, and a ratchet assembly 19 adapted to transmit the motion of the gear ring 15 or the planet cage 13 to the hub shell 20.

The gear ring 15 is generally cylindrical and the internal gear teeth 16 are formed adjacent one end thereof. The extreme end of the ring is provided with some twelve axial dogs 21. A radially inwardly directed flange 22 is provided at the opposite end of the gear ring, such flange 22 presenting six radial dogs 23 for a purpose later to be made apparent. The driver 17 is of conventional form and has axial splines 24 at the inner surface thereof, such splines receiving dogs 25 formed at the outer end of the selector sleeve 18 into engagement therewith in the usual manner.

Figure 5:
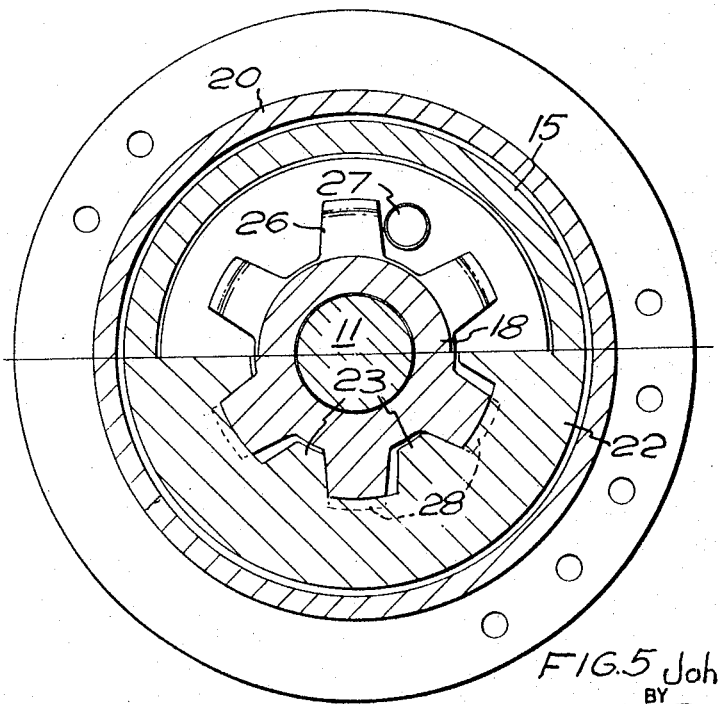
FIG. 5 is a section on line D—D of FIG. 1, the upper portion of such figure showing the clutch in the high gear position, the lower portion showing the clutch in the normal and low gear positions.

The inner end of the selector sleeve 18 is likewise provided with dogs 26, such dogs being six in number and being arranged for abutment against planet pins 27 when the hub is in high gear condition (FIG. 5 upper half), or for engagement with the radial dogs 23 to the gear ring 15 when in normal or low gear condition (FIG. 5 lower half). Extensions 28 are provided in respect of each dog 26, such extensions, as is clearly apparent from FIGS. 1 and 5, abutting the rear face of the flange 22 when the selector sleeve 18 is in a position corresponding to normal gear and serving to move the gear ring axially into low gear position.

A helical spring 29 is provided between the shoulder 30 of the driver 17 and the front face of the gear ring flange 22 such spring 29 urging the gear ring 15 to the left in FIG. 1.

The ratchet assembly 19 comprises a pawl ring assembly consisting of a pawl drive plate 31, a pawl ring plate 32 located in spaced parallel disposition relative to said plate 31, three pawl members 33 mounted on pins 34 extending between the plates 31 and 32, and a ratchet ring 35 carried by a ball ring 36 engaged with the end of the hub shell 20, the said ring being aligned with the pawl members 33. A unidirectional clutch 37 is provided between the pawl drive plate 31 and the planet cage 13.

The pawl drive plate 31 has peripheral dogs 38 for engagement with the axial dogs 21 provided on the gear ring, such dogs 38 making face contact with the dogs 21 as is readily apparent from FIG. 3.

Figure 2:
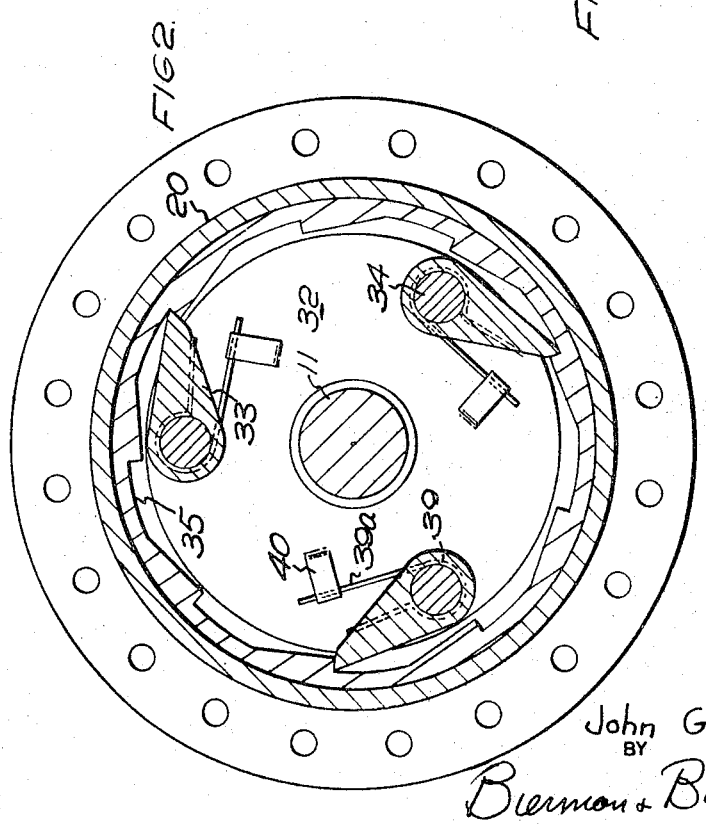
FIG. 2 is a section on line A—A of FIG. 1.
Figure 4:
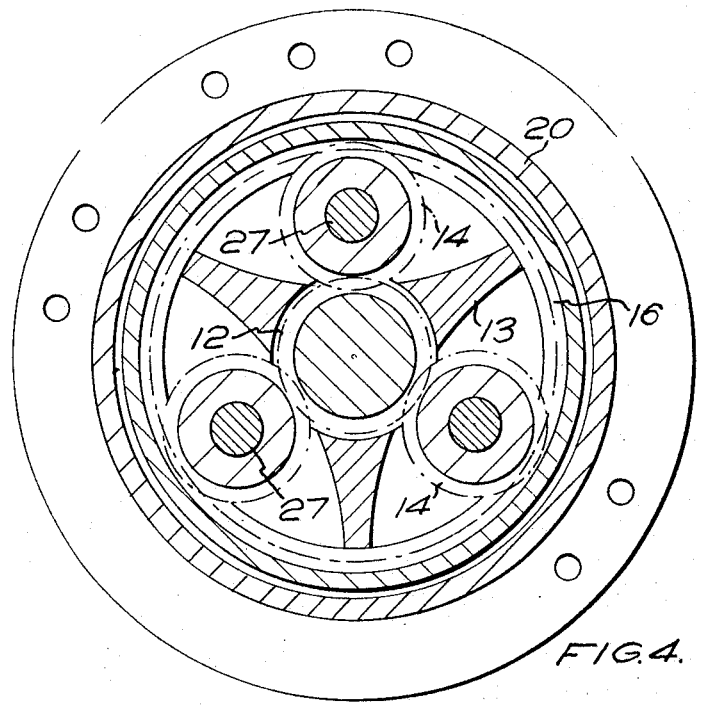
FIG. 4 is a section on line C—C of FIG. 1.

The pawl members 33, referring now particularly to FIG. 2, are spring loaded outwardly and into engagement with the ratchet ring 35 by pawl springs 39, such springs 39 having the tails 39a thereof located in pockets 40 sheared from the pawl ring plate 32.

The unidirectional clutch 37 is best shown in FIGS. 1 and 3 and comprises a plurality of ramp formations 41 formed on the planet cage 13, a roller 42 in contact with each such formation 41 and a roller spacer 43 for maintaining said rollers 42 in a requisite spaced disposition. The rollers 42 thus lie between the ramp formation 41 and the inner peripheral surface of the pawl drive plate 31. A drag spring 44 is provided in respect of the roller spacer 43 which tends to cause such spacer to lag behind rotational motion of the planet cage 13 and thus to assist in obtaining an immediate drive through the clutch 37 when desired.

The operation of the gear hub is as follows:

For high gear the selector sleeve 18 is in the position shown in FIG. 1 and the motion of the driver 17, as derived from the chain sprocket 45, is transmitted through such sleeve 18 to the planet pins 27. Rotation of the planet cage consequent upon such transmission results in the rotation of the gear ring 15 and thus of the pawl drive plate 31. A drive is taken from the plate 31 through the pawl members 33 to the ratchet ring 35 and thence to the hub shell 20.

To engage normal gear the selector sleeve 18 is displaced to the right in FIG. 1 until the dogs 26 thereof move out of abutment with the pins 27 and into engagement with the radial dogs 23 on the gear ring 15. Motion of the driver 17 is thus transmitted to the gear ring 15 by way of the selector sleeve 18, and from the gear ring 15 to the pawl drive plate 31, through the interengaged dogs 21 and 38. The drive from the plate 31 to the hub shell 20 is through the pawl members 33 and ratchet ring 35 as before.

For low gear the selector sleeve is moved further to the right against the restraint not only of the conventional return spring 46, but also of the helical spring 29 and the gear ring 15 is displaced to the right so that the dogs 21 thereof move out of engagement with the dogs 38 on the pawl drive plate. Motion of the driver 17 is thus transmitted from the selector sleeve 18 to the gear ring 15, through the planet gears 14 to the cage 13 and thence through the unidirectional clutch 37 to the pawl drive plate 31. The final drive is through the pawl members 33 and ratchet ring 35.

It is to be appreciated, of course, that in high and normal gears the rotational speed of the pawl drive plate 31 exceeds the rotational speed of the planet cage 13 and thus the unidirectional clutch 37 is being over-run; in low gear, however the pawl drive plate 31 is coupled to the planet cage 13 through the clutch 37 and moves at the same speed as the said plate 31, the gear ring 15 being disengaged from the said pawl drive plate for low gear operation of the assembly.

The invention is not limited to the exact feature of the embodiment hereinbefore described since alternatives will readily present themselves to one skilled in the art. For example, the actual form assumed by the ratchet assembly may be varied to suit particular requirements and although a unidirectional clutch of the kind described and illustrated is preferred, the invention is not limited to a clutch of this character. Furthermore, in some instances it may be found advantageous to form internal dogs or teeth on the planet cage to receive the radial dogs at the inner end of the selector sleeve instead of effective abutment between the pawl pins and dogs as hereinbefore described.

It is thought that the hub assembly hereinbefore described will present certain advantages both from the commercial and from the practical aspect. For example, many of the component parts may be fabricated by pressing operations and thus the more costly machining operations avoided. The ticking normally associated with change speed gear hubs which incorporate two pawl and ratchet arrangements and of which one is usually being over-run in normal and high gears is avoided.

I claim:

1. An epicyclic change speed gear hub including fixed sun gear, a plurality of planet gears rotatable about said fixed gear, a planet cage in which said planet gears are supported, a gear ring disposed radially outwardly of said planet gears and in engagement therewith a driver adapted, selectively, to be coupled with said gear ring or said planet cage, an axially movable selector sleeve adapted to effect such coupling, a ratchet assembly adapted to transmit the motion of said planet cage or gear ring to a hub shell, said gear ring being axially displaceable into or out of engagement with said ratchet assembly and a unidirectional clutch means is provided between the planet cage and the ratchet assembly, the said clutch means being adapted to transmit a drive from the planet cage to the ratchet assembly when the gear ring is operatively disengaged from such assembly but to be inoperative in transmitting a drive when the gear ring is in operative engagement with the said assembly.

2. A gear hub as claimed in claim 1 wherein the unidirectional clutch means comprises a clutch or free-wheel of the wedge roller type.

3. A gear hub as claimed in claim 2 wherein said ratchet assembly includes a pawl ring assembly rotatably mounted relative to the hub axle and between which and the planet cage the unidirectional clutch means is located, and a ratchet ring fixed relative to the hub shell and rotatable therewith, the said pawl ring assembly being coupled to the gear ring and, furthermore, presenting pawl members adapted for driving engagement with said ratchet ring.

4. A gear hub as claimed in claim 3 wherein the pawl ring assembly comprises a pawl drive plate, a pawl ring plate located in spaced parallel disposition relative to the said drive plate and a plurality of pawl members supported on pins extending between the said plates.

5. A gear hub as claimed in claim 4 wherein said pawl ring assembly includes a pawl ring plate and peripheral dogs to the said pawl ring plate, and the gear ring presents axial dogs with which the said peripheral dogs are engageable.

6. A gear hub as claimed in claim 1 wherein the selector sleeve is adapted to displace the gear ring axially thus to disengage said ring from the ratchet assembly, the said sleeve presenting extensions to radial dogs provided at the inner end thereof, the said extensions making contact with an inwardly directed flange to the gear ring and displacing such ring upon movement of the sleeve in an appropriate sense.

7. A gear hub as claimed in claim 6 wherein a drag spring is provided in respect of the unidirectional clutch means.

8. An epicyclic change speed gear hub including fixed sun gear, a plurality of planet gears rotatable about said fixed gear, a planet cage in which said planet gears are supported, a gear ring disposed radially outwardly of said planet gears and in engagement therewith a driver adapted selectively, to be coupled with said gear ring or said planet cage, an axially movable selector sleeve adapted to effect such coupling, and a ratchet assembly adapted to transmit the motion of said planet cage or gear ring to a hub shell, said gear ring being axially displaceable into or out of engagement with said ratchet assembly, a unidirectional clutch means provided between the planet cage and the ratchet assembly, said ratchet assembly including a pawl ring assembly rotatably mounted relative to the hub axle and between which and the planet cage the unidirectional clutch means is located and a ratchet ring fixed relative to the hub shell and rotatable therewith, the said pawl ring assembly being coupled to the gear ring and presenting pawl members adapted for driving engagement with said ratchet ring, the said unidirectional clutch means being adapted to transmit a drive from the planet cage to the ratchet assembly when the gear ring is operatively disengaged from such assembly but to be inoperative in transmitting a drive when the gear ring is in operative engagement with the said assembly.

9. A gear hub as claimed in claim 8 wherein the pawl ring assembly comprises a pawl drive plate, a pawl ring plate located in spaced parallel disposition relative to the said drive plate and a plurality of pawl members supported on pins extending between the said plates.

10. A gear hub as claimed in claim 9 wherein said pawl ring assembly includes a pawl ring plate having peripheral dogs thereto and the gear ring has axial dogs with which the said peripheral dogs are engageable.

11. A gear hub as claimed in claim 10 wherein the selector sleeve is adapted to displace the gear ring axially thus to disengage said ring from the ratchet assembly, the said sleeve presenting extensions to radial dogs provided at the inner end thereof, the said extensions making contact with an inwardly directed flange to the gear ring and displacing such ring upon movement of the sleeve in an appropriate sense.

12. A gear hub as claimed in claim 11 wherein a drag spring is provided in respect of the unidirectional clutch means.

13. An epicyclic change speed gear hub including a fixed sun gear, a plurality of planet gears rotatable about said fixed gear, a planet cage in which said planet gears are supported, a gear ring disposed radially outwardly of said planet gears and in engagement therewith, a driver adapted, selectively to be coupled with said gear ring on said planet cage, an axially movable selector sleeve adapted to effect such coupling, a ratchet assembly adapted to transmit the motion of said planet cage or gear ring to a hub shell, a unidirectional clutch means operatively disposed between the planet cage and the ratchet assembly, and means whereby the gear ring is axially displaceable into or out of engagement with said ratchet assembly, said unidirectional clutch means being adapted to transmit a drive from the planet cage to the ratchet assembly when the gear ring is operatively disengaged from such assembly but to be inoperative in transmitting a drive when the gear ring is in operative engagement with the said assembly.

14. A gear hub as claimed in claim 1 wherein the unidirectional clutch means is of the wedge roller type.

15. An epicyclic change speed gear hub including a fixed sun gear, a plurality of planet gears rotatable about said fixed gear, a planet cage in which said planet gears are supported, a gear ring disposed radially outwardly of said planet gears and in engagement therewith, a driver adapted, selectively to be coupled with said gear ring or said planet cage, and axially movable selector sleeve adapted to effect such coupling, a ratchet assembly adapted to transmit the motion of said planet cage or gear ring to a hub shell, a unidirectional clutch means of the wedge roller type operatively disposed between the planet cage and the ratchet assembly, and means whereby the gear ring is axially displaceable into or out of engagement with said ratchet assembly, said unidirectional clutch means being adapted to transmit a drive from the planet cage to the ratchet assembly when the gear ring is operatively disengaged from such assembly but to be inoperative in transmitting a drive when the gear ring is in operative engagement with the said assembly, the ratchet assembly including a pawl ring assembly comprising a pawl drive plate, a pawl ring plate located in spaced disposition relative to the said drive plate, and a plurality of pawl members supported on pins extending between said plates, and pawl members for driving engagement with the ratchet ring.

16. A gear hub as claimed in claim 15 in which peripheral dogs are provided on the pawl ring plate, and axial dogs are formed on the gear ring, the said peripheral and axial dogs being adapted to be engageable one with the other.

17. A gear hub as claimed in claim 16 wherein the selector sleeve is adapted to displace the gear ring axially thus to disengage said ring from the ratchet assembly, the said sleeve presenting extensions to radial dogs provided at the inner end thereof, the said extensions making contact with an inwardly directed flange to the gear ring and displacing such ring upon movement of the sleeve in an appropriate sense.

References Cited by the Examiner
UNITED STATES PATENTS

| | | | |
|---|---|---|---|
| 1,277,070 | 8/1918 | Harrison | 74—750 |
| 2,327,740 | 8/1943 | Pfister | 74—750 |
| 2,854,108 | 9/1958 | Douglas | 74—750 X |
| 2,910,157 | 10/1959 | Gleasman | 74—750 X |
| 3,136,179 | 6/1964 | Kaiser | 74—750 |

DAVID J. WILLIAMOWSKY, *Primary Examiner.*

J. R. BENEFIEL, *Assistant Examiner.*